Patented July 1, 1941

UNITED STATES PATENT OFFICE 2,247,559

WIPING SOLDER

George S. Phipps, Chatham, and Earle E. Schumacher, Maplewood, N. J., assignors to Bell Telephone Laboratories, Incorporated, New York, N. Y., a corporation of New York No Drawing. Application September 10, 1940, Serial No. 356,193

6 Claims. (Cl. 75—166)

The present invention relates to solders and more particularly to wiping solders.

Specifically the present invention relates to an improvement in the wiping solders described in United States Patent 2,191,624 to G. S. Phipps and E. E. Schumacher. The wiping solders described in said United States patent were characterized by the fact that they contained a definite percentage of arsenic which acted as a grain refining agent. These wiping solders were more easy to handle during wiping operations and possessed what skilled wipers termed a "velvety feel." The fineness of the grain structure of the solid portions of the solder when in the plastic semimolten state and the wetting power of the liquid phase of these wiping solders in the plastic state, which qualities are improved by the presence of the arsenic, appear to cause retention of the liquid phase in the plastic mass during wiping operations, thus preventing it from running out and causing a porous joint. As a result of the easier handling and greater cohesiveness of this type of solder the percentage of sound joints produced in normal wiping operations is greater than when ordinary wiping solders are used.

It is an object of the present invention to produce a wiping solder which is of such a character that it is more easily handled and that it results in the production of an even higher percentage of non-porous joints than the arsenic containing solder described above, when used in normal wiping operations, particularly those operations involving the formation of joints of small diameter.

The superior solder of the present invention is made up of lead, tin, arsenic and antimony, together with the incidental impurities ordinarily found in solder grades of lead. Ordinary wiping solders are made up of a lead-tin alloy containing from about 30 per cent to about 40 per cent tin with the remainder lead, together with incidental impurities. Those wiping solders used for wiping cable joints are usually richer in tin, having tin contents lying in the range of about 34 per cent to about 40 per cent tin and preferably in the range of about 37 per cent to about 40 per cent tin. The compositions of the wiping solders of the present invention will fall within these broad ranges, the small amounts of added materials being substituted for an equivalent weight of lead.

The amount of arsenic necessary for the proper grain refining exceeds .02 per cent, preferably .05 per cent and more preferably .08 per cent. The maximum amount of arsenic is limited to about .15 per cent by the solubility of the arsenic in the solder composition. Preferably the amount of arsenic is below .12 per cent. The most desirable amount of arsenic has been found to be about .1 per cent.

The desirable effect caused by the addition of antimony increases progressively from insignificant amounts up to several tenths of a per cent. When a solder containing more than about .5 per cent antimony is cooled from a molten state an antimony bearing constituent tends to solidify in the form of acicular crystals. In the American wiping practice where the solidifying solder in the plastic state is wiped with a textile cloth, solders which form these acicular crystals are unsatisfactory, since the needle-like ends of the crystals projecting from the mass of the solder engage the cloth causing small bodies of solder to be pulled from the solder mass and adhere to the cloth, thus making it difficult to work the plastic body of solder. This condition sets the upper limit of antimony at about .5 per cent or preferably .45 per cent. For the antimony to exert a reasonable influence on the properties of the lead-tin-arsenic solder, it is desirable that the amount of antimony exceed .2 per cent and preferably .3 per cent. The most desirable amount of antimony appears to be about .4 per cent.

The lead and tin which are used for the preparation of the wiping solder of the present invention may be pure metals but are preferably ordinary solder grades of lead and tin, containing the incidental impurities common to this type of lead and tin. It has been observed that the properties of wiping solders prepared from the latter types of lead and tin are somewhat superior to the properties of wiping solders prepared from pure metals. This is believed due to the fact that the small amounts of various impurities form discontinuous points or seeds in the cooling molten solder for the formation of crystals, thus contributing to the formation of a larger number of finer crystals. Fineness of the lead-rich crystals which are precipitated from molten wiping solder during cooling is believed an important factor in ease of handling and in the formation of sound joints. Some of the common impurities found in lead are one or more of copper, silver, indium, nickel, iron, bismuth, aluminum and zinc. Typical solder grades of lead are chemical lead, copper lead, corroding lead or the secondary leads. A typical secondary lead has the following composition:

| | |
|---|---|
| Sn | .018 |
| Sb | .17 |
| Cu | .025 |
| Bi | .072 |
| As | .0006 |
| Fe | .0005 |
| Ag | .0043 |
| Pb | remainder |

Solder grades of tin usually contain similar impurities. It is, of course, to be understood that the example given above is not to be considered as limiting either the nature or amounts of impurities present in the metals used for preparing the solder of the present invention.

In some instances where pure lead is used for making up the wiping solder, it may be desirable to add one or more or all of the elements commonly present as impurities in amounts of the order of the amounts found in solder grade lead. The addition of copper is believed particularly beneficial and it may sometimes be desirable to add this element in amounts up to about .5 per cent.

A preferred solder according to the present invention contains about 37 per cent tin, about .1 per cent arsenic, about .4 per cent antimony and the remainder lead, together with incidental impurities. The amounts of tin, arsenic and antimony may vary within the ranges set forth above.

The solder of the present invention may be prepared in any suitable manner. Thus elemental arsenic and antimony may be added to a preformed lead-tin alloy. Alternatively, either or both antimony and arsenic may be added to the lead or tin alone, and this mixture may be subsequently alloyed with the other major constituent of the solder. Tin bearing drosses containing antimony will sometimes be found a desirable source of antimony for the purposes of the present invention. As stated above, amounts of various elements corresponding to the incidental impurities in the solder grades of lead may be added at any stage of the manufacture of the solder if pure lead is employed.

Where the term "incidental impurities" is used to define the composition of wiping solders in the following claims, the claims are to be understood to include solders prepared from virgin metals where the incidental impurities may be present in amounts so slight as to be undetectable, as well as solders prepared from solder grade metals which contain the common impurities. The term is also intended to include solders containing amounts of elements corresponding to the common impurities found in solder grades of lead even though these elements may have been intentionally added and were not initially present in the ingredients of the solder.

What is claimed is:

1. A wiping solder containing an amount of tin between about 30 per cent and about 40 per cent by weight, an amount of arsenic between about .02 per cent and about .15 per cent by weight, an appreciable amount of antimony less than about .5 per cent and the remainder lead, together with incidental impurities.

2. A wiping solder containing an amount of tin between about 30 per cent and about 40 per cent by weight, an amount of arsenic between about .02 per cent and about .15 per cent by weight, an amount of antimony greater than about .3 per cent and not exceeding about .45 per cent and the remainder lead, together with incidental impurities.

3. A wiping solder containing an amount of tin between about 30 per cent and about 40 per cent by weight, an amount of arsenic exceeding about .05 per cent, but less than about .15 per cent, an amount of antimony exceeding about .2 per cent, but not greater than .45 per cent, and the remainder lead together with incidental impurities.

4. A wiping solder containing an amount of tin between about 34 per cent and about 40 per cent by weight, an amount of arsenic exceeding about .08 per cent, but less than about .15 per cent, an amount of antimony exceeding .3 per cent but not greater than .45 per cent, and the remainder lead together with incidental impurities.

5. A wiping solder containing about 37 per cent tin by weight, an amount of arsenic exceeding about .08 per cent, but less than .12 per cent, an amount of antimony exceeding .2 per cent, but not greater than .45 per cent, and the remainder lead together with incidental impurities.

6. A wiping solder containing an amount of tin between about 37 per cent to about 40 per cent by weight, an amount of arsenic exceeding .05 per cent, but less than .15 per cent, an amount of antimony exceeding .3 per cent, but not greater than .45 per cent, and the remainder lead together with incidental impurities.

GEORGE S. PHIPPS.
EARLE E. SCHUMACHER.